United States Patent
Zou et al.

(10) Patent No.: US 11,863,072 B2
(45) Date of Patent: Jan. 2, 2024

(54) EFFICIENT BYPASS SWITCHES FOR DC/DC CONVERTER

(71) Applicant: GM GLOBAL TECHNOLOGY OPERATIONS LLC, Detroit, MI (US)

(72) Inventors: Yusheng Zou, Northville, MI (US); Lei Hao, Troy, MI (US); Chengwu Duan, Shanghai (CN); Jian Yao, Shanghai (CN); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 26 days.

(21) Appl. No.: 17/549,324

(22) Filed: Dec. 13, 2021

(65) Prior Publication Data

US 2023/0080123 A1    Mar. 16, 2023

(30) Foreign Application Priority Data

Sep. 14, 2021   (CN) .......................... 202111076058.0

(51) Int. Cl.
*B60L 58/18*     (2019.01)
*H02J 7/00*      (2006.01)
*H02M 3/158*     (2006.01)

(52) U.S. Cl.
CPC ........... *H02M 3/1582* (2013.01); *B60L 58/18* (2019.02); *H02J 7/0013* (2013.01); *H02J 7/0063* (2013.01); *B60L 2210/12* (2013.01); *B60L 2210/14* (2013.01); *H02J 2207/20* (2020.01)

(58) Field of Classification Search
CPC .. H02M 3/1582; B60L 58/18; B60L 2210/12; B60L 2210/14; H02J 7/0013; H02J 7/0063; H02J 2207/20; Y02T 10/70
See application file for complete search history.

(56) References Cited

U.S. PATENT DOCUMENTS

2022/0416660 A1* 12/2022 Zhou .................. H02M 1/0077

FOREIGN PATENT DOCUMENTS

CN            212381120 U   *  1/2021

OTHER PUBLICATIONS

Office Action dated Jun. 13, 2022 from German Patent Office for German Patent Application No. 102021129566.1; 6 pages.

* cited by examiner

*Primary Examiner* — Elim Ortiz

(57) ABSTRACT

A power control system includes a battery system and a DC-DC converter with first, second, third, and fourth power switches. A second terminal of the first power switch is connected to a first terminal of the second power switch. A second terminal of the third power switch is connected to a first terminal of the fourth power switch. A first inductor includes a first terminal connected to the second terminal of the first power switch and the first terminal of the second power switch and a second terminal connected to the second terminal of the third power switch and the first terminal of the fourth power switch. A first bypass switch is connected in parallel to the first power switch. A second bypass switch is connected in parallel to the third power switch.

20 Claims, 9 Drawing Sheets

| Mode | | Q1 | Q2 | Q3 | Q4 | SW1 | SW3 |
|---|---|---|---|---|---|---|---|
| Discharge-Buck | Opt 1 | SW | SW | On | Off | Off | Off |
| | Opt 2 | SW | SW | Off | Off | Off | On |
| Discharge-Boost | Opt 1 | On | Off | SW | SW | Off | Off |
| | Opt 2 | Off | Off | SW | SW | On | Off |
| Charge-Buck | Opt 1 | On | Off | SW | SW | Off | Off |
| | Opt 2 | Off | SW | On | Off | On | Off |
| Charge-Boost | Opt 1 | SW | SW | Off | Off | Off | On |
| | Opt 2 | SW | SW | Off | Off | Off | On |
| Bypass (all) | | Off | Off | Off | Off | On | On |

| Discharge-Buck to Bypass or Charge-Boost to Bypass | | | | | | |
|---|---|---|---|---|---|---|
| State | Initial | Step 1 | Step 2 | Step 3 | Step 4 | Step 5 (Final) |
| T1 | SW | SW | SW | SW | SW | Off |
| T2 | SW | SW | SW | Off | Off | Off |
| T3 | On | On | Off | Off | Off | Off |
| T4 | Off | Off | Off | Off | Off | Off |
| S1 | Off | Off | Off | Off | On | On |
| S2 | Off | On | On | On | On | On |

FIG. 7

| Bypass to Discharge-Buck or Bypass to Charge-Boost | | | | | | |
|---|---|---|---|---|---|---|
| State | Initial | Step 1 | Step 2 | Step 3 | Step 4 | Step 5 (Final) |
| T1 | Off | Off | Off | SW | SW | Sw |
| T2 | Off | Off | Off | Off | Off | Sw |
| T3 | Off | On | On | On | On | On |
| T4 | Off | Off | Off | Off | Off | Off |
| S1 | On | On | On | On | Off | Off |
| S2 | On | On | Off | Off | Off | Off |

FIG. 8

| Discharge-Boost to Bypass or Charge-Buck to Bypass | | | | | | |
|---|---|---|---|---|---|---|
| State | Initial | Step 1 | Step 2 | Step 3 | Step 4 | Step 5 (Final) |
| T1 | On | On | Off | Off | Off | Off |
| T2 | Off | Off | Off | Off | Off | Off |
| T3 | Sw | Sw | Sw | Sw | Sw | Off |
| T4 | Sw | Sw | Sw | Off | Off | Off |
| S1 | Off | On | On | On | On | On |
| S2 | Off | Off | Off | Off | On | On |

FIG. 9

| Bypass to Discharge-Boost or Bypass to Charge-Buck | | | | | | |
|---|---|---|---|---|---|---|
| State | Initial | Step 1 | Step 2 | Step 3 | Step 4 | Step 5 (Final) |
| T1 | Off | On | On | On | On | On |
| T2 | Off | Off | Off | Off | Off | Off |
| T3 | Off | Off | Off | Sw | Sw | Sw |
| T4 | Off | Off | Off | Off | Off | Sw |
| S1 | On | On | Off | Off | Off | Off |
| S2 | On | On | On | On | Off | Off |

FIG. 10

EFFICIENT BYPASS SWITCHES FOR DC/DC CONVERTER

CROSS-REFERENCE TO RELATED APPLICATIONS

This application claims the benefit of Chinese Patent Application No. 202111076058.0, filed on Sep. 14, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to DC-DC converters, and more particularly to DC-DC converters including bypass switches.

A battery system for battery electric vehicles (BEVs) and hybrid vehicles typically includes one or more battery packs each including one or more battery cells. During operation, one or more electric motors of the BEV or hybrid vehicle provide propulsion for the vehicle. The battery system may be charged by connecting the vehicle to a utility and/or to the battery system of another vehicle. The battery may also be charged during braking of the vehicle when the electric motor is operated as a generator. A battery management system may be used to control charging and discharging of the battery system.

The battery system outputs power to one or more DC-DC converters that convert the voltage of the battery pack to one or more other voltage levels that supply vehicle loads. During operation, some of the power switches of the DC-DC converter are continuously on for relatively long periods during certain operating modes. While the power switch is on, conduction loss occurs. In some situations, the power that needs to be delivered exceeds the level that the DC/DC converter can handle, which may cause damage to system components.

SUMMARY

A power control system for a vehicle comprising a battery system including one or more battery packs. A DC-DC converter is connected to the battery system and includes first, second, third, and fourth power switches each including a control terminal, a first terminal and a second terminal. The second terminal of the first power switch is connected to the first terminal of the second power switch. The second terminal of the third power switch is connected to the first terminal of the fourth power switch. A first inductor includes a first terminal connected to the second terminal of the first power switch and the first terminal of the second power switch and a second terminal connected to the second terminal of the third power switch and the first terminal of the fourth power switch. A first bypass switch includes a control terminal, a first terminal connected to the first terminal of the first power switch and a second terminal connected to the second terminal of the first power switch. A second bypass switch includes a control terminal, a first terminal connected to the first terminal of the third power switch and a second terminal connected to the second terminal of the third power switch. An electric motor receiving power from the battery system via the DC-DC converter is configured to provide propulsion to one or more wheels of the vehicle.

In other features, a controller selectively closes the first bypass switch and the second bypass switch during operation to reduce conduction loss of the first power switch and the third power switch, respectively. A controller selectively closes the first bypass switch and the second bypass switch during a mode change, where the mode change occurs when switching operation from a discharge-buck mode of the DC-DC converter to a bypass mode of the DC-DC converter, a charge-boost mode of the DC-DC converter to the bypass mode, a discharge-boost mode of the DC-DC converter to the bypass mode, and a charge-buck mode of the DC-DC converter mode to the bypass mode.

In other features, a controller selectively opens the first bypass switch and the second bypass switch during a mode change, where the mode change occurs when switching operation from the bypass mode to a discharge-buck mode of the DC-DC converter, the bypass mode to a charge-boost mode of the DC-DC converter, the bypass mode to a discharge-boost mode of the DC-DC converter, and the bypass mode to a charge-buck mode of the DC-DC converter mode.

In other features, a controller is configured to transition from one of a discharge-buck mode and a charge-boost mode to a bypass mode by starting in an initial state with the first power switch and the second power switching on and off at duty cycles greater than zero and less than one based on first and second pulse-width modulated signals, respectively. The third power switch is on based on a third pulse-width modulated signal. The fourth power switch is off based on a fourth pulse-width modulated signal. The first and second bypass switches are off.

In other features, the controller is configured to sequentially transition the second bypass switch on, the third power switch off, the second power switch off, the first bypass switch on, and the first power switch off. A controller is configured to transition from one of a discharge-boost mode and a charge-buck mode to a bypass mode by starting in an initial state with: the first power switch on based on a first pulse-width modulated signal; the second power switch off based on a second pulse-width modulated signal; the third power switch and the fourth power switching on and off at duty cycles greater than zero and less than one based on third and fourth pulse-width modulated signals, respectively; and the first and second bypass switches off.

In other features, the controller is configured to sequentially transition the first bypass switch on, the first power switch off, the fourth power switch off, the second bypass switch on, and the third power switch off.

In other features, a controller is configured to transition from a bypass mode to one of a discharge-buck mode and a charge-boost mode by starting in an initial state with the first power switch, the second power switch, the third power switch, and the fourth power switch off based on first, second, third, and fourth pulse width modulated signals and the first and second bypass switches on; sequentially transitioning the third power switch on, the second bypass switch off, the first power switch switching on and off at a duty cycle greater than zero and less than one based on the first pulse-width modulated signal, the first bypass switch off, and the second power switch switching on and off at a duty cycle greater than zero and less than one based on the second pulse-width modulated signal.

In other features, a controller is configured to transition from a bypass mode to one of a discharge-boost mode and a charge-buck mode by starting in an initial state with the first power switch, the second power switch, the third power switch, and the fourth power switch off based on first, second, third, and fourth pulse width modulated signals and the first and second bypass switches on; and sequentially transitioning the first power switch on, the first bypass switch off, the third power switch switching on and off at a duty cycle greater than zero and less than one based on the third pulse-width modulated signal, the second bypass switch off, and the fourth power switch switching on and off at a duty cycle greater than zero and less than one based on the fourth pulse-width modulated signal.

A method for operating a DC-DC converter includes providing first, second, third, and fourth power switches each including a control terminal, a first terminal and a second terminal, wherein the second terminal of the first power switch is connected to the first terminal of the second power switch, and wherein the second terminal of the third power switch is connected to the first terminal of the fourth power switch; connecting a first terminal of a first inductor to the second terminal of the first power switch and the first terminal of the second power switch; connecting a second terminal of the first inductor to the second terminal of the third power switch and the first terminal of the fourth power switch; connecting a first terminal of a first bypass switch to the first terminal of the first power switch and a second terminal of the first bypass switch to the second terminal of the first power switch; and connecting a first terminal of a second bypass switch to the first terminal of the third power switch and a second terminal of the second bypass switch to the second terminal of the third power switch.

In other features, the method includes selectively closing the first bypass switch and the second bypass switch during operation to reduce conduction loss of the first power switch and the third power switch, respectively.

In other features, the method includes selectively closing the first bypass switch and the second bypass switch during a mode change, where the mode change occurs when switching operation from: a discharge-buck mode of the DC-DC converter to a bypass mode of the DC-DC converter, a charge-boost mode of the DC-DC converter to the bypass mode, a discharge-boost mode of the DC-DC converter to the bypass mode, and a charge-buck mode of the DC-DC converter mode to the bypass mode.

In other features, the method includes selectively opening the first bypass switch and the second bypass switch during a mode change, where the mode change occurs when switching operation from the bypass mode to a discharge-buck mode of the DC-DC converter, the bypass mode to a charge-boost mode of the DC-DC converter, the bypass mode to a discharge-boost mode of the DC-DC converter, and the bypass mode to a charge-buck mode of the DC-DC converter mode.

In other features, the method includes transitioning from one of a discharge-buck mode and a charge-boost mode to a bypass mode by starting in an initial state with the first power switch and the second power switching on and off at duty cycles greater than zero and less than one based on first and second pulse-width modulated signals, respectively; the third power switch on based on a third pulse-width modulated signal; the fourth power switch off based on a fourth pulse-width modulated signal; and the first and second bypass switches off.

In other features, the method includes sequentially transitioning the second bypass switch on, the third power switch off, the second power switch off, the first bypass switch on, and the first power switch off.

In other features, the method includes transitioning from one of a discharge-boost mode and a charge-buck mode to a bypass mode by starting in an initial state with: the first power switch on based on a first pulse-width modulated signal; the second power switch off based on a second pulse-width modulated signal; the third power switch and the fourth power switching on and off at duty cycles greater than zero and less than one based on third and fourth pulse-width modulated signals, respectively; and the first and second bypass switches off.

In other features, the method includes sequentially transitioning the first bypass switch on, the first power switch off, the fourth power switch off, the second bypass switch on, and the third power switch off.

In other features, the method includes transitioning from a bypass mode to one of a discharge-buck mode and a charge-boost mode by: starting in an initial state with the first power switch, the second power switch, the third power switch, and the fourth power switch off based on first, second, third, and fourth pulse width modulated signals and the first and second bypass switches on; and sequentially transitioning the third power switch on, the second bypass switch off, the first power switch switching on and off at a duty cycle greater than zero and less than one based on the first pulse-width modulated signal, the first bypass switch off, and the second power switch switching on and off at a duty cycle greater than zero and less than one based on the second pulse-width modulated signal.

In other features, the method includes transitioning from a bypass mode to one of a discharge-boost mode and a charge-buck mode by starting in an initial state with the first power switch, the second power switch, the third power switch, and the fourth power switch off based on first, second, third, and fourth pulse width modulated signals and the first and second bypass switches on; and sequentially transitioning the first power switch on, the first bypass switch off, the third power switch switching on and off at a duty cycle greater than zero and less than one based on the third pulse-width modulated signal, the second bypass switch off, and the fourth power switch switching on and off at a duty cycle greater than zero and less than one based on the fourth pulse-width modulated signal.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7 to 10 are tables illustrating switching logic to transition between various buck/boost, charge/discharge and bypass modes according to the present disclosure.

In the drawings, reference numbers may be reused to identify similar and/or identical elements.

DETAILED DESCRIPTION

The present disclosure relates to DC-DC converters including bypass switches to bypass the power switches in some of the operating modes of the power control system. While the foregoing description relates to a DC-DC converter in a vehicle, the present disclosure relates to DC-DC converters used in other applications.

Figure 1:
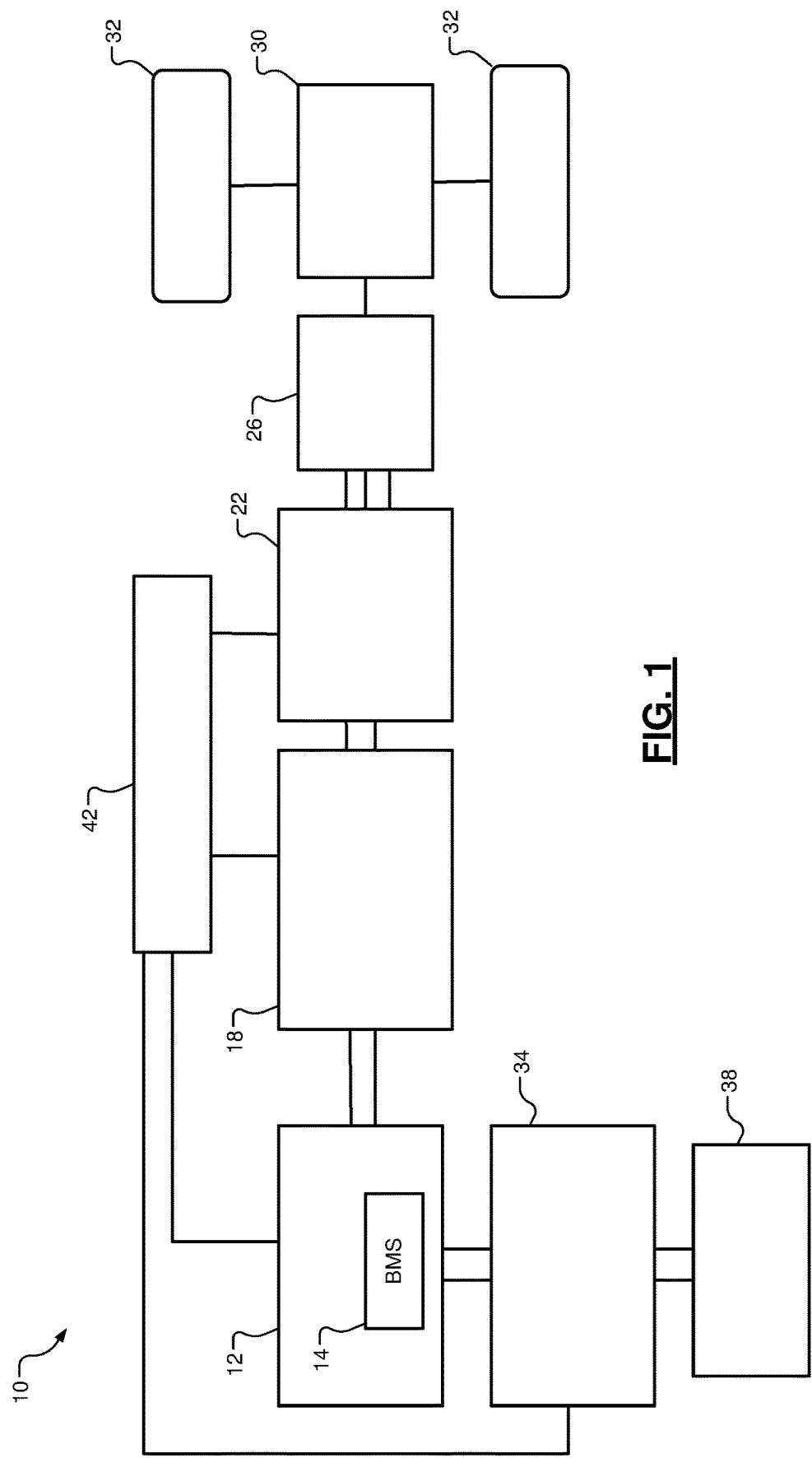
FIG. 1 is a functional block diagram of an example of a vehicle including a battery system and one or more DC-DC converters according to the present disclosure.

Referring now to FIG. 1, a vehicle 10 includes a battery system 12 with a battery management system 14. In some examples, the battery system 12 is a high voltage battery system operating at voltage levels above 100V, such as 300V, 400V, 800V, etc., although lower or higher voltage levels can be used. The battery system 12 is connected to a DC-DC converter 18 that changes a ratio between an input voltage $V_{in}$ and an output voltage $V_{out}$. For example when the DC-DC converter operates in a buck mode, $V_{in} > V_{out}$. When the DC-DC converter operates in a boost mode, $V_{in} < V_{out}$.

The DC-DC converter 18 is connected to a DC-AC inverter 22 that converts single phase DC power to three-phase AC power. One or more electric motors 26 are connected to the DC-AC inverter 22. The one or more motors 26 drive one or more wheels 32 directly (e.g. wheel hub motors or direct drive) or indirectly via a gearbox 30. While a single motor is shown driving two front or rear wheels, additional motors can be provided to drive rear or front wheels, respectively, and/or to drive each wheel independently.

The battery system 12 is further connected to one or more DC-DC converters 34. In some examples, the DC-DC converter 34 has an output voltage that is lower than an output voltage of the DC-DC converter 18. The DC-DC converter 34 converts battery voltage to a level (e.g. 12V, 24V, 36V, 48V, . . . ) used by auxiliary loads 38.

Figure 2:
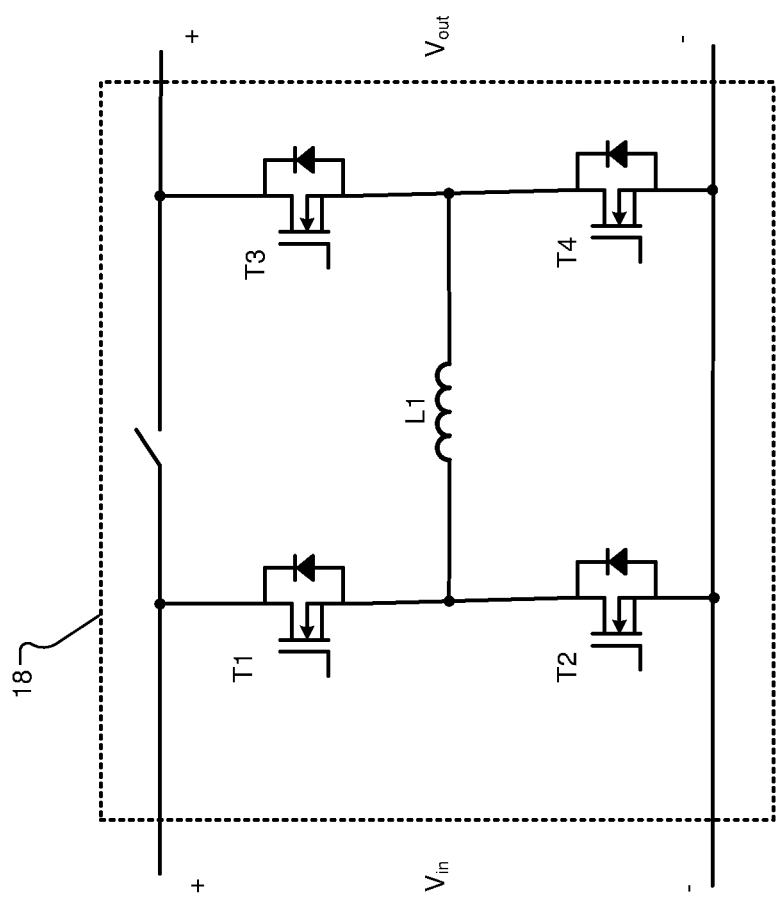
FIG. 2 is an electric schematic of an example of a DC-DC converter including a single bypass switch.

Referring now to FIG. 2, an example of the DC-DC converter 18 includes a single bypass switch SW0, power switches T1, T2, T3, and T4, and an inductor L1. The power switches T1, T2, T3, and T4 include a control terminal and first and second terminals. The control terminal is used to turn the power switches T1, T2, T3, and T4 on and off. In some examples, each of the power switches receives a pulse width modulated signal having a duty cycle between 0 and 1 inclusive. Switched On corresponds to a duty cycle 1, switched Off corresponds to a duty cycle of 0, and switching states correspond to duty cycles between 0 and 1. Each of the power switches T1 to T4 can include one or more power switch that are connected in parallel, series, or a combination thereof depending upon the application.

A first terminal of a power switch T1 is connected to a first terminal of a first side of the DC-DC converter 18 and to a first terminal of the bypass switch SW0. A second terminal of the power switch T1 is connected to a first terminal of an inductor L1 and a first terminal of the power switch T2. A first terminal of a power switch T3 is connected to a first terminal of a second side of the DC-DC converter 18 and to a second terminal of the bypass switch SW0. A second terminal of the power switch T3 is connected to a second terminal of an inductor L1 and a first terminal of a power switch T4. Second terminals of the power switches T2 and T4 are connected together and to second terminals of the first side and second side of the DC-DC converter 18, respectively. In use, the bypass switch SW0 may be closed during certain operating modes when the input and output voltages of the DC-DC converter 18 are about the same.

Figure 3:
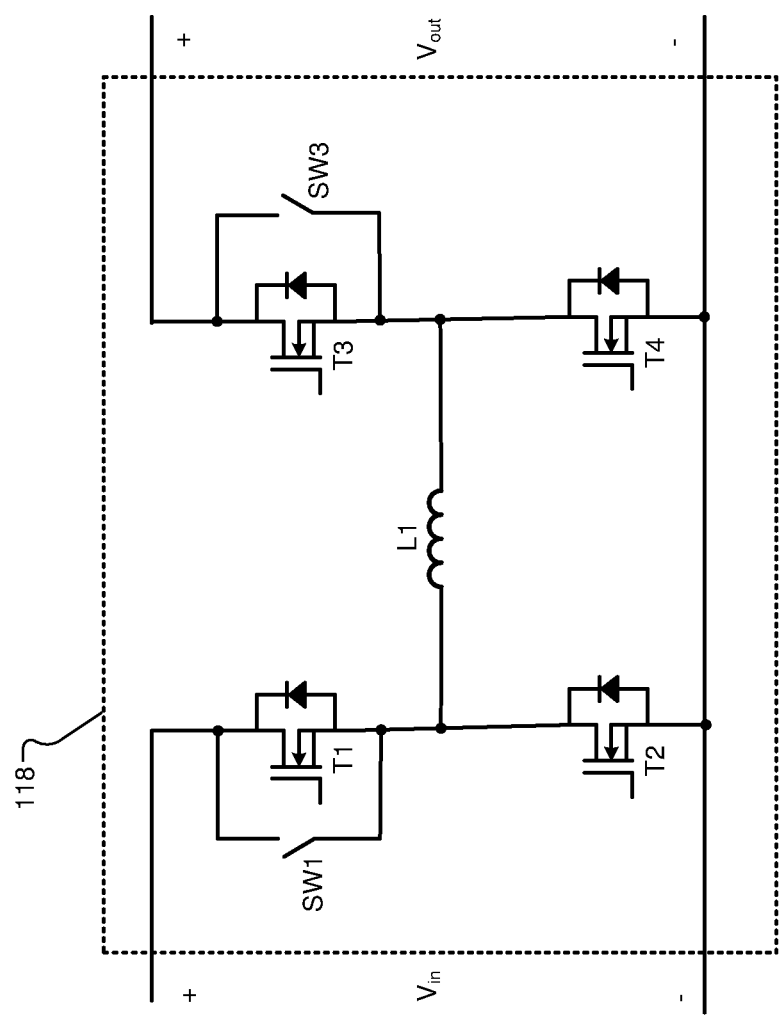
FIG. 3 is an electrical schematic of an example of a DC-DC converter including two bypass switches according to the present disclosure.

Referring now to FIG. 3, an example of the DC-DC converter 118 according to the present disclosure is shown. The DC-DC converter 118 includes power switches T1, T2, T3, and T4, an inductor L1, and bypass switches SW1 and SW3. The power switches T1, T2, T3, and T4 may include voltage-controlled bipolar switching devices in the form of insulated gate bipolar transistors (IGBTs), metal-oxide semi-conductor field effect transistors (MOSFETs), wide bandgap GaN or SiC devices (WBG), or other suitable power switches. The power switches T1, T2, T3, and T4 include a control terminal and first and second terminals. The control terminal is used to turn the power switch on and off. Each of the power switches T1 to T4 can include one or more power switch that are connected in parallel, series, or a combination thereof depending upon the application.

A first terminal of a power switch T1 is connected to a first terminal of a first side of the DC-DC converter 118 and to a first terminal of the bypass switch SW1. A second terminal of the power switch T1 is connected to a first terminal of an inductor L1, a first terminal of a power switch T2 and a second terminal of the bypass switch SW1.

A first terminal of a power switch T3 is connected to a first terminal of a second side of the DC-DC converter 118 and to a first terminal of a second bypass switch SW3. A second terminal of the power switch T3 is connected to a second terminal of an inductor L1, a first terminal of a power switch T4 and a second terminal of the second bypass switch SW3. Second terminals of the power switches T2 and T4 are connected together and to second terminals of the first side and the second side of the DC-DC converter 118, respectively.

The power control system according to the present disclosure can operate in different modes. The DC-DC converter operates in a buck mode when an input side of the DC-DC converter is higher than an output side. The DC-DC converter operates in a boost mode when an input side of the DC-DC converter is lower than an output side. During a charge mode of the battery packs, power is output by the DC-DC converter to the battery system to charge the battery system. During a discharge mode of the battery packs, power is output by the DC-DC converter to the vehicle loads to discharge the battery system. During the bypass mode, the bypass switches are closed to reduce conduction and/or switching losses. The power control system according to the present disclosure transitions from the various boost/buck and charge/discharge modes to the bypass mode and from the bypass mode to the various boost/buck and charge/discharge modes (as shown in FIGS. 7-10).

Figure 4A:
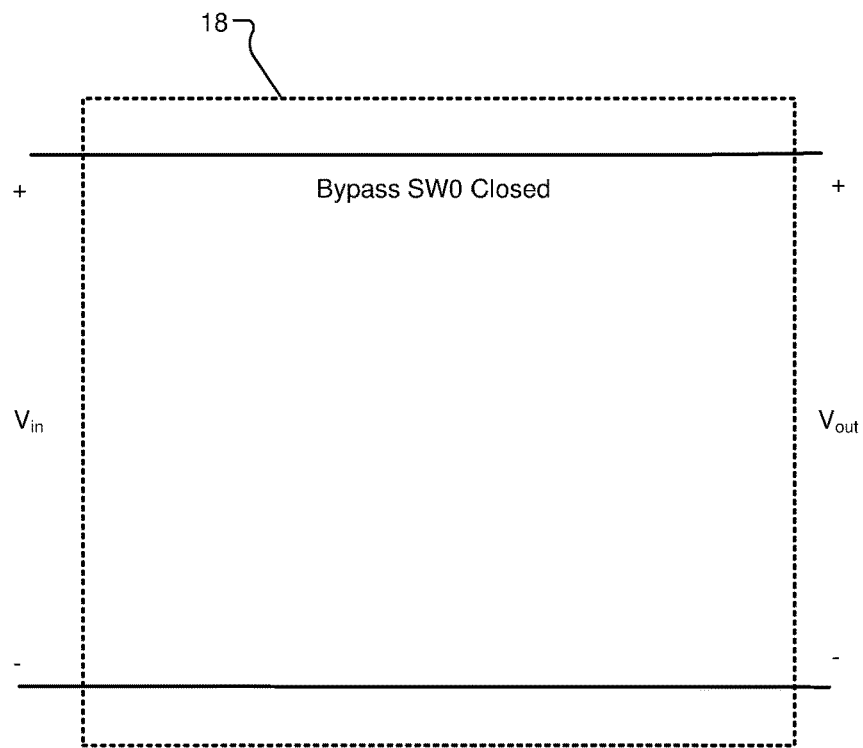
FIG. 4A is an electrical schematic showing an example of an equivalent circuit when the single bypass switch of FIG. 2 is closed.
Figure 4B:
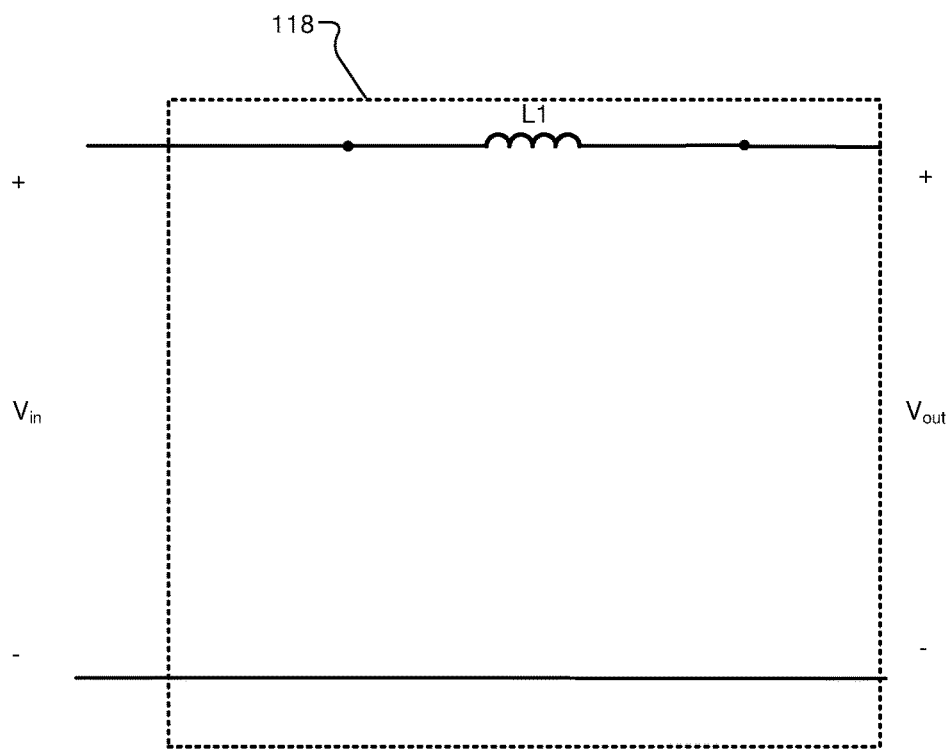
FIG. 4B is an electrical schematic showing an example of an equivalent circuit when the bypass switches of FIG. 3 are closed.

Referring now to FIGS. 4A-4B, operation of the DC-DC converters are shown in their respective bypass modes. In FIG. 4A, the DC-DC converter 18 in FIG. 2 is shown with the single bypass switch SW0 closed. In FIG. 4B, the DC-DC converter 118 in FIG. 3 is shown with the bypass switches SW1 and SW3 closed. The bypass switches SW1 and SW3 eliminate high conduction losses from the power switches T1 and T3 while ensuring smoother current transition during mode changes to prevent components from breakdown.

Figures 4C, 5:
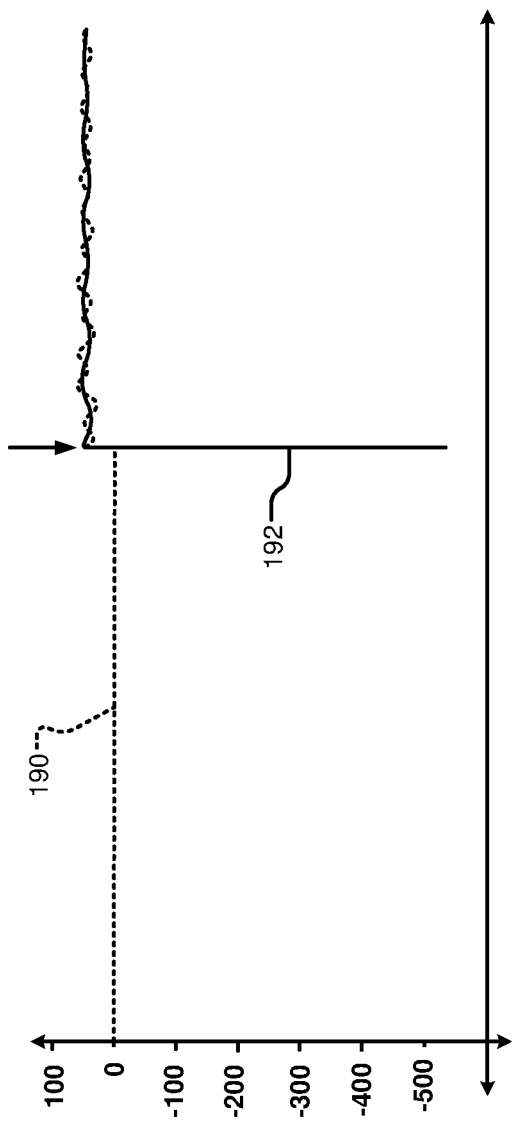
FIG. 4C is a graph illustrating current as a function of time with a single bypass switch as in FIGS. 2 and 4A and when using the bypass switches of FIGS. 2 and 4B according to the present disclosure.
FIG. 5 is a table showing an example of states of the switches during various operating modes according to the present disclosure.

In FIG. 4C, current is shown as a function of time during a mode transition for the DC-DC converter 118 of FIG. 3 (shown at 190) with the bypass switches SW1 and SW3 and a DC-DC converter 18 with a single bypass switch SW0 and without the bypass switches SW1 and SW3 (shown at 190). When the bypass SW0 is closed or opened, differences in voltages and currents between the input and output may cause current to spike, which may cause damage to the components of the DC/DC converter. For example, it may cause a power switch to break down. Solid line 192 shows the current spike in the single bypass switch SW0 of the DC-DC converter 18 in FIG. 2 when the single bypass switch SW0 is closed.

With the inductor L1 in the bypass branch of the DC-DC converter 118 in FIG. 3, the current cannot instantly change, which provides smoother transitions during mode changes. When the input and output levels are nearly the same, the input side of the DC/DC converter can directly supply the desired voltage and current to the output. But when doing so, power switches T1 and T3 will be always, or nearly always, conducting. This causes high and unnecessary conduction loss, which adversely affects the efficiency of the DC-DC converter.

The bypass switches SW1 and SW3 can be realized using mechanical relays, contactors, and/or solid state relays. The bypass switches SW1 and SW3 are connected across the power switches T1 and T3, respectively, to eliminate the high conduction losses produced by the power switches T1 and T3 when closed for longer periods with high duty cycles. Some modes may also eliminate switching losses of the power switches as will be described further below. When an output power level is higher than the voltage or current levels that the power switches can safely handle, the two bypass switches SW1 and SW3 can also be applied to directly link the input to the output.

Both bypass switches SW1 and SW3 are closed in several situations. The bypass switches SW1 and SW3 are closed when the controller 42 determines that input and output voltage levels are similar and within rated voltage, current, and power of DC/DC converter (e.g., <+/−5%). The bypass switches SW1 and SW3 are also closed when the controller 42 determines that the required output level to drive the motor (or reverse in regenerative braking) exceeds the rated (or safe) power, voltage, current of the DC-DC converter. Examples when this condition may occur include driving up an incline, climbing a step (high curb, etc.), full accelerator, and/or braking hard.

In some examples, only one bypass switch SW1 is closed to bypass the power switch T1 when the controller 42 stays in discharge-boost mode or charge-buck mode for a period longer than a first predetermined period. For example, the first predetermined period can be set to greater than or equal to 15 s, 30 s, 60 s, 90 s or 120 s, although shorter or longer periods can be used.

In some examples, the bypass switch SW3 is engaged to bypass the power switch T3 when the controller 42 stays in discharge-buck mode or charge-boost mode for a period longer than a second predetermined period. For example, the second predetermined period can be set to greater than or equal to 15 s 30 s, 60 s, 90 s or 120 s, although shorter or longer periods can be used.

When in bypass mode, the bypass switches SW1 and SW3 are closed and all of the power switches T1, T2, T3, and T4 can be turned off.

Referring now to FIG. 5, states of the power switches T1, T2, T3, and T4 and the bypass switches SW1 and SW3 are shown for various operating modes. In FIG. 5, Option 1 (Opt 1) refers to operation without closing the bypass switches SW1 and SW3 and Option 2 (Opt 2) refers to operation with one of the bypass switches SW1 and SW3 closed. "SW" refers to switching on and off the power switches T1, T2, T3, and/or T4 during operation (e.g. based on a pulse width modulated (PWM) signal). "ON" refers to conducting and "OFF" refers to not conducting.

The power switches T1, T2, T3, and T4 are controlled ON and OFF based on the voltage applied to the control terminal or gate of the corresponding power switch. In some examples, a switching signal such as a PWM signal is output to the control terminals of one or more of the power switches to allow operation in various modes such as buck or boost modes while other ones of the power switches are either continuously ON or OFF.

In some examples, the bypass switches SW1 and SW3 are operated at relatively low frequency. In some examples, ON and OFF states last on the order of seconds or minutes to realize the desired circuit for each mode.

The bypass switches SW1 and SW3 bypass the power switches T1 and T3, respectively, while connecting the inductor L1 that is already in the main circuit of DC-DC converter 118 into the bypass branch of the circuit. This operation ensures smoother current and voltage transitions during mode changes to prevent components from breakdown. Examples of mode changes include buck mode or boost mode to bypass mode or bypass mode to buck mode or boost mode.

For example only, a battery system operates at ~660V and supplies 75 A in a discharge-buck mode. Switching of the power switches T1 and T2 is being performed at 75 kHz. When operating in Opt 1, the power switch T1 has about 260 W in conduction loss and the power switch T3 has about 110 W of conduction loss. In bypass mode, however, the bypass switches SW1 and SW3 have about 6 W of conduction loss.

Figure 6A:
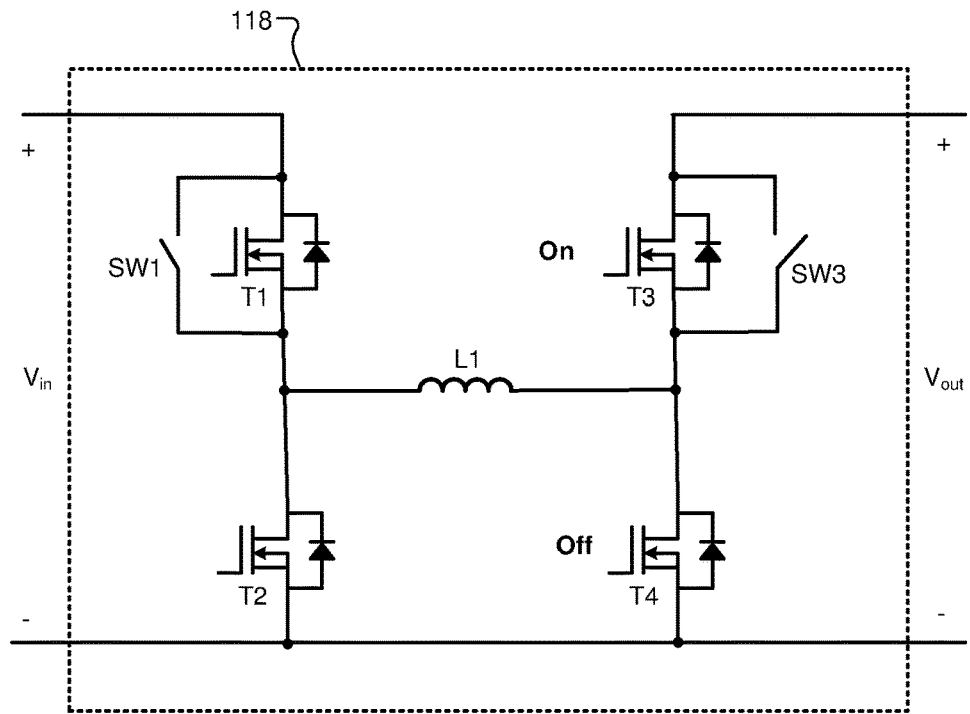
FIGS. 6A to 6F illustrate operation of the DC-DC converter when switching between discharge-buck mode to bypass mode or charge-boost mode to bypass mode.
Figure 6B:
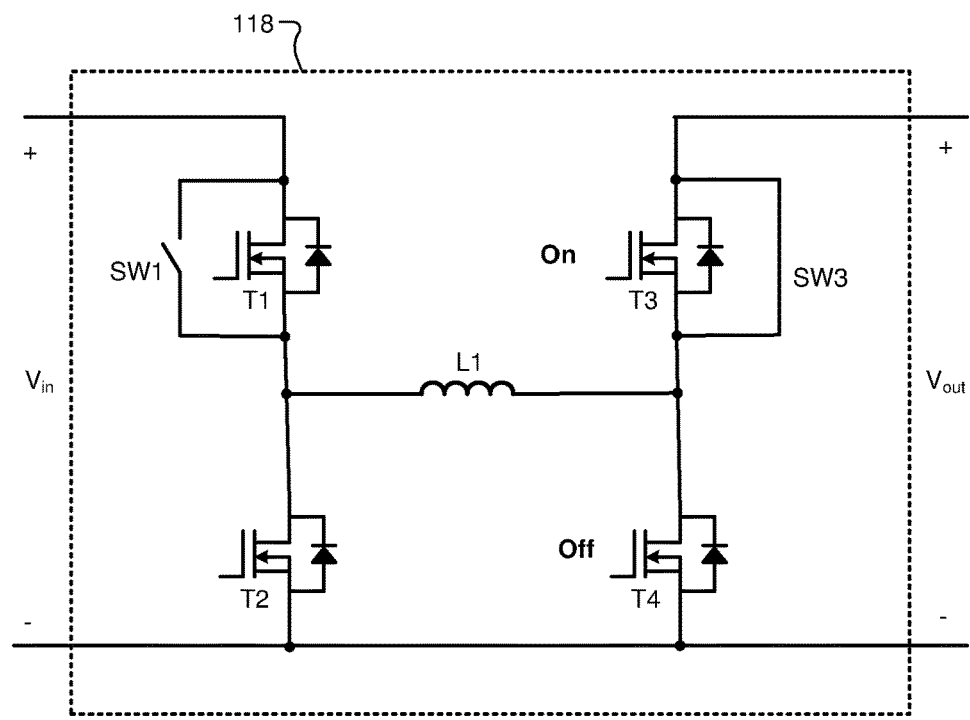
Figure 6C:
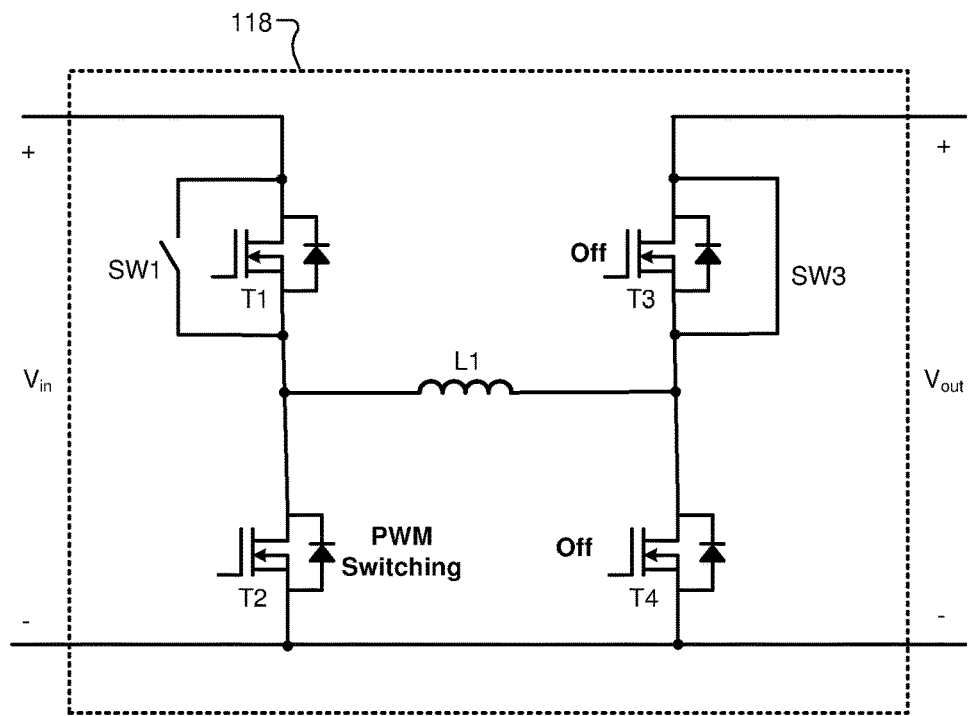
Figure 6D:
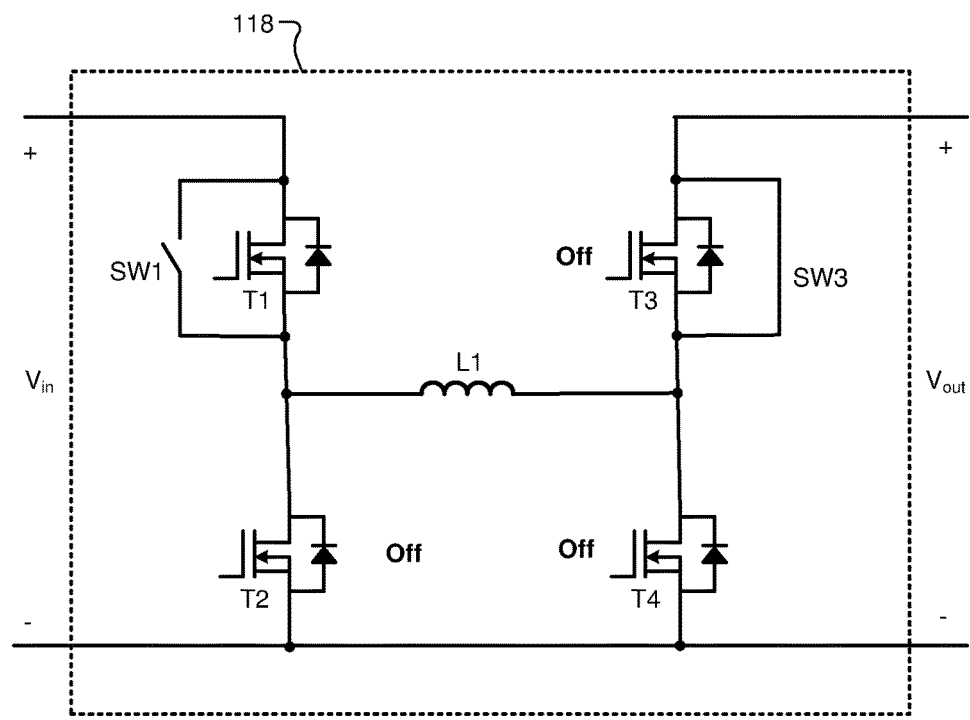
Figure 6E:
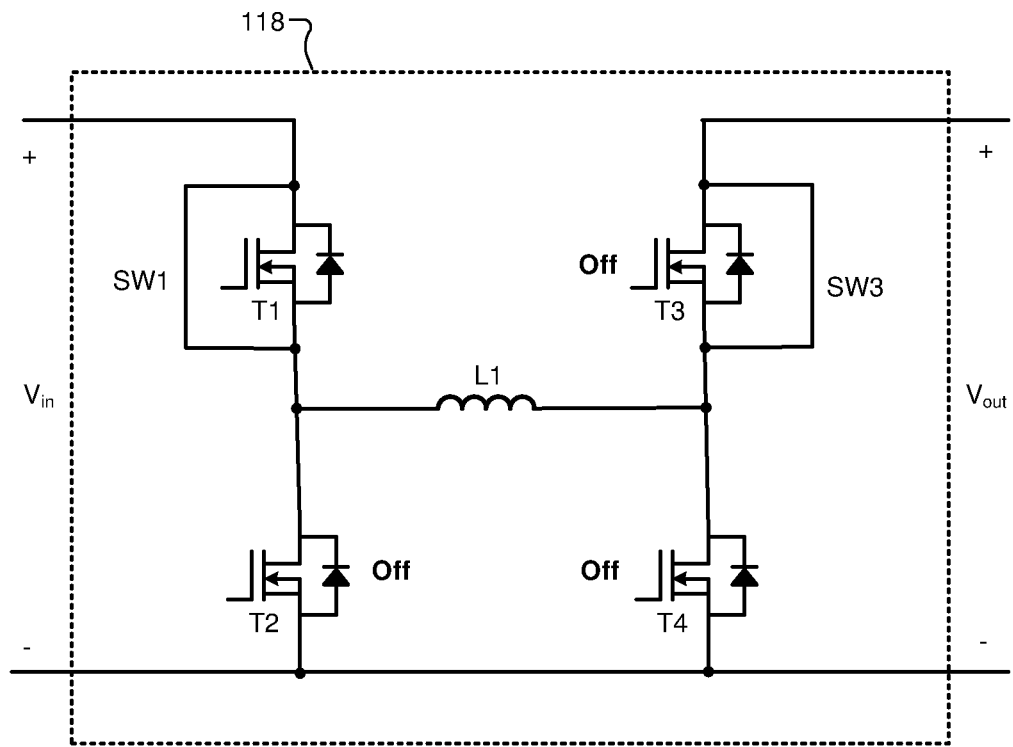
Figure 6F:
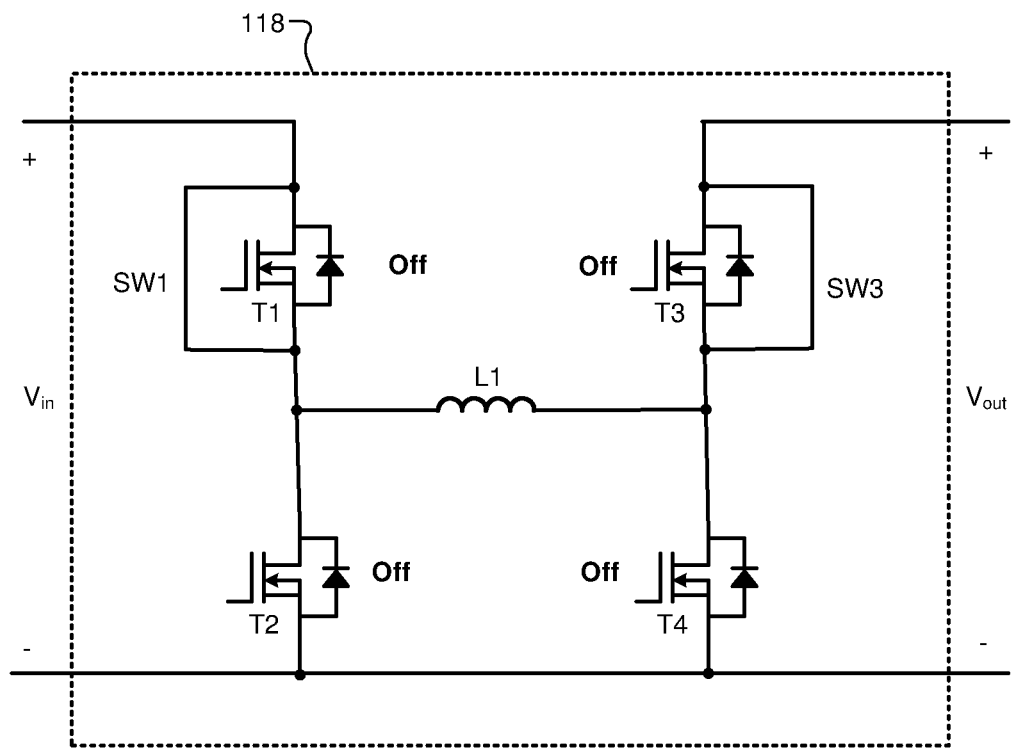

Referring now to FIGS. 6A to 6F, operation of the DC-DC converter is shown when transitioning between discharge-buck mode and bypass mode or charge-boost mode and bypass mode. In FIG. 6A, an initial mode is shown with power switches T1 and T2 switching, the power switch T3 is ON and the power switch T4 is OFF. The bypass switches SW1 and SW3 are OFF. In FIG. 6B, the bypass switch SW3 is turned ON across the power switch T3. In FIG. 6C, the power switch T3 is turned off and conduction loss in the power switch T3 is eliminated. In FIG. 6D, the power switch T2 is turned off and switching loss in the power switch T2 is eliminated. In FIG. 6E, the bypass switch SW1 is closed across the power switch T1. In FIG. 6F, the power switch T1 is turned off and conducting and switching loss in the power switch T1 is eliminated.

Referring now to FIGS. 7 to 10, tables illustrating switching logic when transitioning between various modes are shown. In FIG. 7, switching logic when transitioning between discharge-buck mode and bypass mode or charge-boost mode and bypass mode is shown. In FIG. 8, switching logic when transitioning between bypass mode and discharge-buck mode or bypass mode and charge-boost mode is shown. In FIG. 9, switching logic when transitioning between discharge-boost mode and bypass mode or charge-buck mode and bypass mode is shown. In FIG. 10, switching logic when transitioning between bypass mode and discharge-boost mode or bypass and charge-buck mode is shown.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for a vehicle comprising:
a battery system including one or more battery packs;
a DC-DC converter connected to the battery system including:
first, second, third, and fourth power switches each including a control terminal, a first terminal and a second terminal,
wherein the second terminal of the first power switch is connected to the first terminal of the second power switch, and wherein the second terminal of the third power switch is connected to the first terminal of the fourth power switch;
a first inductor including a first terminal connected to the second terminal of the first power switch and the first terminal of the second power switch and a second terminal connected to the second terminal of the third power switch and the first terminal of the fourth power switch;
a first bypass switch including a control terminal, a first terminal connected to the first terminal of the first power switch and a second terminal connected to the second terminal of the first power switch; and
a second bypass switch including a control terminal, a first terminal connected to the first terminal of the third power switch and a second terminal connected to the second terminal of the third power switch;
an electric motor configured to receive power from the battery system via the DC-DC converter and to provide propulsion to one or more wheels of the vehicle; and
a controller configured to transition from one of a discharge-buck mode and a charge-boost mode to a bypass mode by starting in an initial state with the first power switch and the second power switching on and off at duty cycles greater than zero and less than one based on first and second pulse-width modulated signals, respectively, the third power switch on based on a third pulse-width modulated signal, the fourth power switch off based on a fourth pulse-width modulated signal, and the first and second bypass switches off.

2. The power control system of claim 1, wherein the controller is configured to selectively close the first bypass switch and the second bypass switch during operation to reduce conduction loss of the first power switch and the third power switch, respectively.

3. The power control system of claim 1, wherein the controller is configured to selectively close the first bypass switch and the second bypass switch during a mode change, where the mode change occurs when switching operation from:
the discharge-buck mode of the DC-DC converter to the bypass mode of the DC-DC converter, or
the charge-boost mode of the DC-DC converter to the bypass mode.

4. The power control system of claim 1, wherein the controller is configured to selectively open the first bypass switch and the second bypass switch during a mode change, where the mode change occurs when switching operation from:
the bypass mode to the discharge-buck mode of the DC-DC converter, or
the bypass mode to the charge-boost mode of the DC-DC converter.

5. The power control system of claim 1, wherein the controller is configured to sequentially transition the second bypass switch on, the third power switch off, the second power switch off, the first bypass switch on, and the first power switch off.

6. The power control system of claim 1, wherein the controller is configured to transition from the bypass mode to one of the discharge-buck mode and the charge-boost mode by:
starting in an initial state with the first power switch, the second power switch, the third power switch, and the fourth power switch off based on first, second, third, and fourth pulse width modulated signals and the first and second bypass switches on; and
sequentially transitioning the third power switch on, the second bypass switch off, the first power switch switching on and off at a duty cycle greater than zero and less than one based on the first pulse-width modulated signal, the first bypass switch off, and the second power switch switching on and off at a duty cycle greater than zero and less than one based on the second pulse-width modulated signal.

7. The power control system of claim 1, wherein the controller is configured to:
selectively close the first bypass switch and the second bypass switch during a first mode change, where the first mode change occurs when switching operation from the discharge-buck mode of the DC-DC converter to the bypass mode of the DC-DC converter or the charge-boost mode of the DC-DC converter to the bypass mode; and
selectively open the first bypass switch and the second bypass switch during a second mode change, where the second mode change occurs when switching operation from the bypass mode to the discharge-buck mode of the DC-DC converter or the bypass mode to the charge-boost mode of the DC-DC converter.

8. A method for operating a DC-DC converter comprising:
providing first, second, third, and fourth power switches each including a control terminal, a first terminal and a second terminal,
wherein the second terminal of the first power switch is connected to the first terminal of the second power switch, and wherein the second terminal of the third power switch is connected to the first terminal of the fourth power switch;
connecting a first terminal of a first inductor to the second terminal of the first power switch and the first terminal of the second power switch;
connecting a second terminal of the first inductor to the second terminal of the third power switch and the first terminal of the fourth power switch;
connecting a first terminal of a first bypass switch to the first terminal of the first power switch and a second terminal of the first bypass switch to the second terminal of the first power switch;

connecting a first terminal of a second bypass switch to the first terminal of the third power switch and a second terminal of the second bypass switch to the second terminal of the third power switch; and transitioning from one of a discharge-buck mode and a charge-boost mode to a bypass mode by starting in an initial state with the first power switch and the second power switching on and off at duty cycles greater than zero and less than one based on first and second pulse-width modulated signals, respectively, the third power switch on based on a third pulse-width modulated signal, the fourth power switch off based on a fourth pulse-width modulated signal, and the first and second bypass switches off.

9. The method of claim 8, further comprising selectively closing the first bypass switch and the second bypass switch during operation to reduce conduction loss of the first power switch and the third power switch, respectively.

10. The method of claim 8, further comprising selectively closing the first bypass switch and the second bypass switch during a mode change, where the mode change occurs when switching operation from:
the discharge-buck mode of the DC-DC converter to the bypass mode of the DC-DC converter, or
the charge-boost mode of the DC-DC converter to the bypass mode.

11. The method of claim 8, further comprising selectively opening the first bypass switch and the second bypass switch during a mode change, where the mode change occurs when switching operation from:
the bypass mode to the discharge-buck mode of the DC-DC converter, or
the bypass mode to the charge-boost mode of the DC-DC converter.

12. The method of claim 8, further comprising sequentially transitioning the second bypass switch on, the third power switch off, the second power switch off, the first bypass switch on, and the first power switch off.

13. The method of claim 8, further comprising transitioning from the bypass mode to one of the discharge-buck mode and the charge-boost mode by:
starting in an initial state with the first power switch, the second power switch, the third power switch, and the fourth power switch off based on first, second, third, and fourth pulse width modulated signals and the first and second bypass switches on; and
sequentially transitioning the third power switch on, the second bypass switch off, the first power switch switching on and off at a duty cycle greater than zero and less than one based on the first pulse-width modulated signal, the first bypass switch off, and the second power switch switching on and off at a duty cycle greater than zero and less than one based on the second pulse-width modulated signal.

14. A power control system for a vehicle comprising:
a battery system including one or more battery packs;
a DC-DC converter connected to the battery system including:
first, second, third, and fourth power switches each including a control terminal, a first terminal and a second terminal,
wherein the second terminal of the first power switch is connected to the first terminal of the second power switch, and wherein the second terminal of the third power switch is connected to the first terminal of the fourth power switch;
a first inductor including a first terminal connected to the second terminal of the first power switch and the first terminal of the second power switch and a second terminal connected to the second terminal of the third power switch and the first terminal of the fourth power switch;
a first bypass switch including a control terminal, a first terminal connected to the first terminal of the first power switch and a second terminal connected to the second terminal of the first power switch; and
a second bypass switch including a control terminal, a first terminal connected to the first terminal of the third power switch and a second terminal connected to the second terminal of the third power switch;
an electric motor configured to receive power from the battery system via the DC-DC converter and configured to provide propulsion to one or more wheels of the vehicle; and
a controller configured to transition from one of a discharge-boost mode and a charge-buck mode to a bypass mode by starting in an initial state with the first power switch on based on a first pulse-width modulated signal, the second power switch off based on a second pulse-width modulated signal, the third power switch and the fourth power switching on and off at duty cycles greater than zero and less than one based on third and fourth pulse-width modulated signals, respectively, and the first and second bypass switches off.

15. The power control system of claim 14, wherein the controller is configured to selectively close the first bypass switch and the second bypass switch during operation to reduce conduction loss of the first power switch and the third power switch, respectively.

16. The power control system of claim 14, wherein the controller is configured to selectively close the first bypass switch and the second bypass switch during a mode change, where the mode change occurs when switching operation from:
the discharge-boost mode of the DC-DC converter to the bypass mode, or
the charge-buck mode of the DC-DC converter to the bypass mode.

17. The power control system of claim 14, wherein the controller is configured to selectively open the first bypass switch and the second bypass switch during a mode change, where the mode change occurs when switching operation from:
the bypass mode to the discharge-boost mode of the DC-DC converter, or
the bypass mode to the charge-buck mode of the DC-DC converter.

18. The power control system of claim 14, wherein the controller is configured to sequentially transition the first bypass switch on, the first power switch off, the fourth power switch off, the second bypass switch on, and the third power switch off.

19. The power control system of claim 14, wherein the controller is configured to transition from the bypass mode to one of the discharge-boost mode and the charge-buck mode by:
starting in an initial state with the first power switch, the second power switch, the third power switch, and the fourth power switch off based on first, second, third, and fourth pulse width modulated signals and the first and second bypass switches on; and
sequentially transitioning the first power switch on, the first bypass switch off, the third power switch switching on and off at a duty cycle greater than zero and less than one based on the third pulse-width modulated signal, the second bypass switch off, and the fourth power switch switching on and off at a duty cycle greater than zero and less than one based on the fourth pulse-width modulated signal.

20. The power control system of claim 14, wherein the controller is configured to:
selectively close the first bypass switch and the second bypass switch during a first mode change, where the first mode change occurs when switching operation from the discharge-boost mode of the DC-DC converter to the bypass mode or the charge-buck mode of the DC-DC converter to the bypass mode; and
selectively open the first bypass switch and the second bypass switch during a second mode change, where the second mode change occurs when switching operation from the bypass mode to the discharge-boost mode of the DC-DC converter or the bypass mode to the charge-buck mode of the DC-DC converter.

\* \* \* \* \*